(12) United States Patent
Chan

(10) Patent No.: US 7,927,028 B2
(45) Date of Patent: Apr. 19, 2011

(54) PROTECTIVE COVER ASSEMBLY FOR ELECTRONIC DEVICE INCLUDING DIGITAL CAMERA

(75) Inventor: Kai-Po Chan, Tu-Cheng (TW)

(73) Assignee: Chi Mei Communication Systemsm Inc., Tu-Cheng, New Taipei (TW)

( * ) Notice: Subject to any disclaimer, the term of this patent is extended or adjusted under 35 U.S.C. 154(b) by 263 days.

(21) Appl. No.: 12/192,210

(22) Filed: Aug. 15, 2008

(65) Prior Publication Data

US 2009/0161215 A1 Jun. 25, 2009

(30) Foreign Application Priority Data

Dec. 19, 2007 (CN) .......................... 2007 1 0203248

(51) Int. Cl.
*G03B 15/06* (2006.01)
*G03B 17/00* (2006.01)
(52) U.S. Cl. ......... 396/448; 396/155; 396/200; 348/371
(58) Field of Classification Search .................. 396/200, 396/448
See application file for complete search history.

(56) References Cited

U.S. PATENT DOCUMENTS

| | | | | |
|---|---|---|---|---|
| 6,823,198 B2 * | 11/2004 | Kobayashi | ................. | 455/556.1 |
| 7,589,785 B2 * | 9/2009 | Kobayashi | .................... | 348/371 |
| 2005/0253923 A1 * | 11/2005 | Komori et al. | ............. | 348/14.02 |
| 2008/0055408 A1 * | 3/2008 | Wun | .............................. | 348/122 |
| 2008/0193118 A1 * | 8/2008 | Lee | ............................... | 396/155 |
| 2008/0205873 A1 * | 8/2008 | Park | .............................. | 396/200 |
| 2009/0137274 A1 * | 5/2009 | Kim et al. | ................. | 455/556.1 |
| 2009/0153729 A1 * | 6/2009 | Hiltunen et al. | ............. | 348/371 |

* cited by examiner

*Primary Examiner* — W. B. Perkey
*Assistant Examiner* — Bret Adams
(74) *Attorney, Agent, or Firm* — Steven M. Reiss

(57) ABSTRACT

A protective cover assembly (40) for digital camera is used for an electronic device (100). The electronic device includes a main body (20) which has a recess portion (210) defined therein. A flash (70) is located in the recess portion. The protective cover assembly includes a cover (49) received in the recess portion. The cover includes a base (46) and a lighttight layer (48) formed on the base. A through hole (462) is defined in the cover, configured for allowing light emitted from the flash to pass the cover.

12 Claims, 4 Drawing Sheets

PROTECTIVE COVER ASSEMBLY FOR ELECTRONIC DEVICE INCLUDING DIGITAL CAMERA

BACKGROUND

1. Field of the Invention

The present invention relates to protective cover assemblies for camera modules, particularly, to a protective cover assembly for camera modules used in an electronic device.

2. Description of Related Art

Nowadays, electronic devices with a camera module mounted thereon are widely used. In order to provide enough light for the photograph, a flash is generally positioned adjacent the digital camera. A transparent cover is customarily disposed on the electronic device so as to prevent the camera module and the flash from being contaminated. The flash emits light and the light mainly passes through the transparent cover. However, some of the light is repeatedly reflected within the transparent cover, which may effect the image quality.

Therefore, a protective cover assembly for camera module using in an electronic device is desired in order to overcome the above-described problems.

BRIEF DESCRIPTION OF THE DRAWINGS

Many aspects of the protective cover assembly can be better understood with reference to the following drawings. The components in the drawings are not necessarily drawn to scale, the emphasis instead being placed upon clearly illustrating the principles of the present protective cover assembly, in which.

DETAILED DESCRIPTION OF THE EMBODIMENTS

Figure 1:
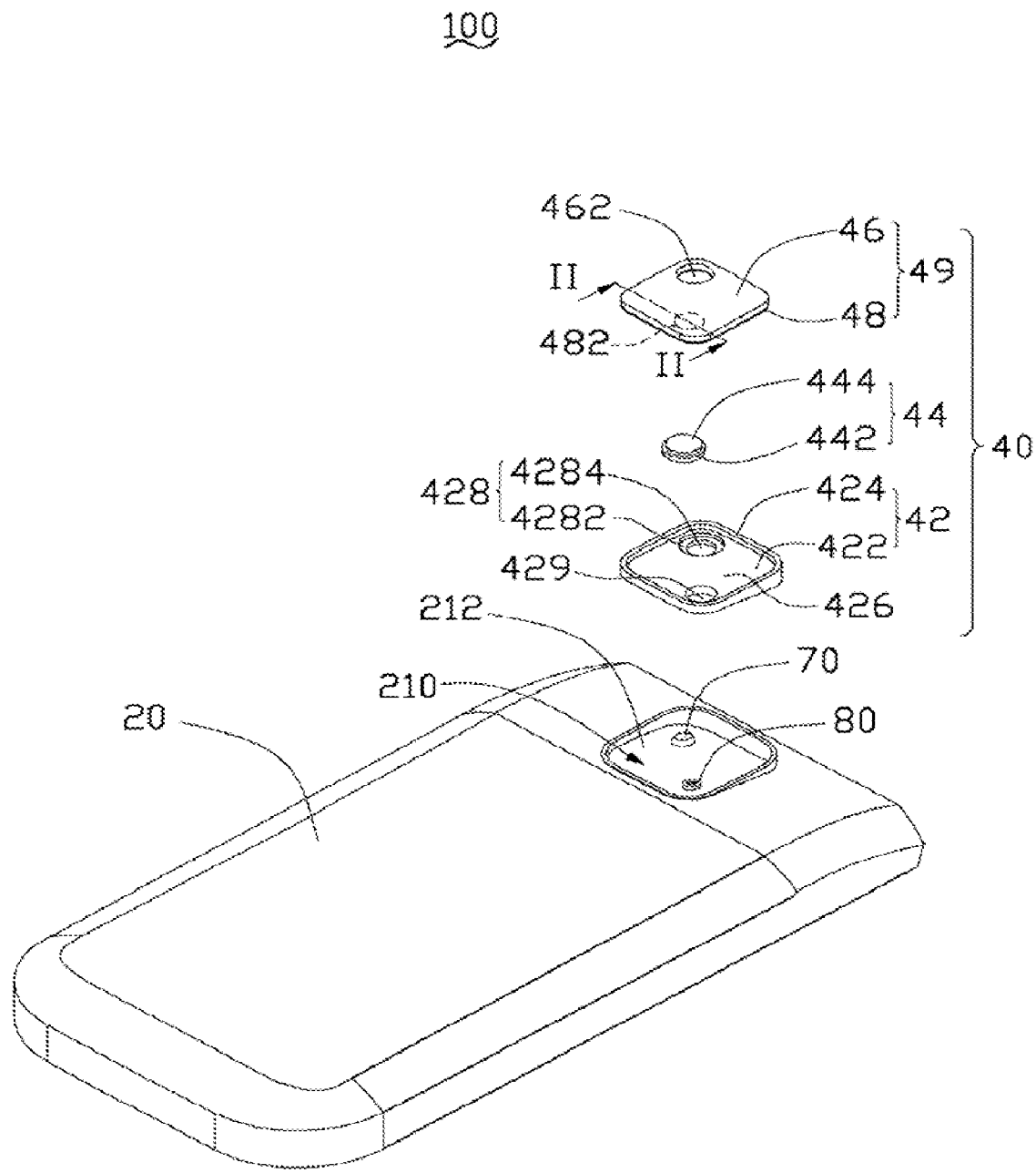
FIG. 1 is an isometric view of an electronic device incorporating a protective cover assembly, in accordance with an exemplary embodiment of the present invention.
Figure 2:
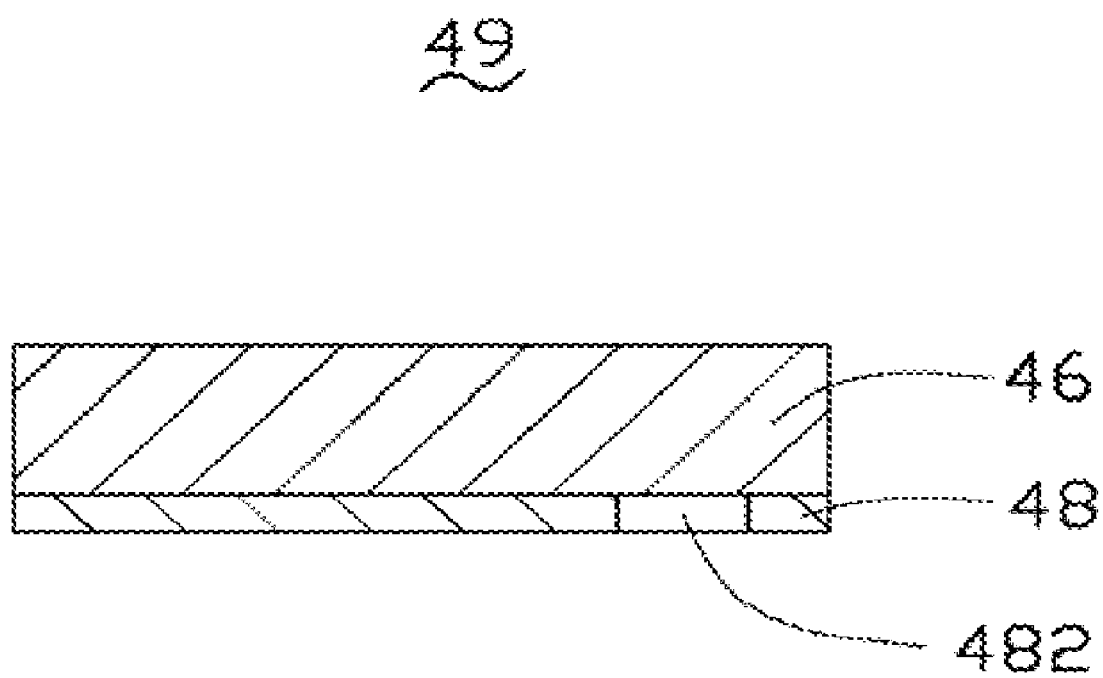
FIG. 2 is an enlarged, cross-sectional view taken along line II-II of FIG. 1, showing a cover of the protective cover assembly.

Referring to FIG. 1, an exemplary electronic device 100, such as a mobile phone or a personal digital assistant (PDA), includes a main body 20, a protective cover assembly 40, a flash 70 and a camera module 80, in accordance with an exemplary embodiment of the present invention.

The main body 20 has a recess portion 210 defined in a surface thereof. The recess portion 210 may be approximately square-shaped and is configured for receiving the protective cover assembly 40. The recess portion 210 has a bottom surface 212. The flash 70 and the camera module 80 are positioned at the bottom surface 212 of the recess portion 210. The flash 70 is configured for emitting light to illuminate the scene to be photographed.

The protective cover assembly 40 includes a supporting board 42, a lens 44 and a cover 49. The lens 44 is a revolving cylinder, and has a flange portion 442 and an extending portion 444. The extending portion 444 is coaxial with the flange portion 442. A diameter of the extending portion 444 is smaller than that of the flange portion 442. The lens 44 has a high light transparency rate so as to allow most of the light emitted from the flash to pass therethough.

Cover 49 has a through hole 462 defined therein and includes a transparent base 46 and a lighttight layer 48 coated on the base 46. The through hole 462 is configured for engaging with the extending portion 444 of the lens 44. The lighttight layer 48 may be an oil ink layer. This oil ink layer includes light absorbing material and is coated on one outer surface of the base 46. A light hole 482 is defined in the lighttight layer 48 so that the camera module 80 can receive light of outside via the transparent base 46.

The supporting board 42 includes a bottom wall 422 and a peripheral sidewall 424, which cooperatively defines a cavity 426. The cavity 426 is configured for engaging with the cover 49. A stepped hole 428 and an aperture 429 are defined in the bottom wall 422. The stepped hole 428 includes a fixing hole 4282 and a receiving hole 4284. The fixing hole 4282 is coaxial with the receiving hole 4284, and a diameter of the fixing hole 4282 is larger than that of the receiving hole 4284. The fixing hole 4282 is configured for engaging with the flange portion 442 of the lens 44. The receiving hole 4284 and the aperture 429 are respectively configured for receiving the flash 70 and the camera module 80.

Figure 3:
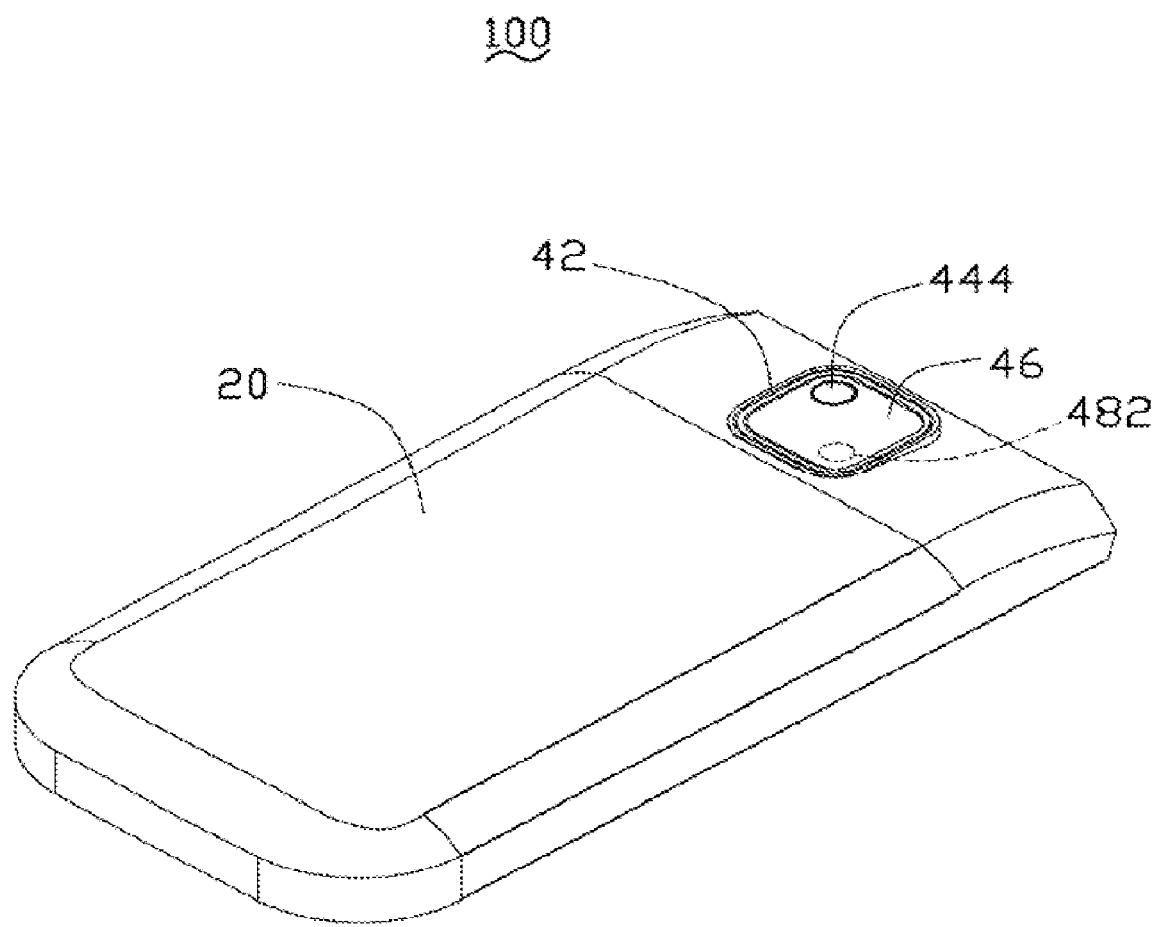
FIG. 3 is an assembled, isometric view of the electronic device shown in FIG. 1, showing the protective cover assembly mounted on a main body of the electronic device.

Also referring to FIG. 3, in assembly of the protective cover assembly 40 to the main body 20, first, the supporting board 42 is attached to the recess portion 210 of the main body 20 by adhesive, with the camera module 80 and the flash 70 respectively received in the receiving hole 4284 and the aperture 429 of the bottom wall 422. The flange portion 442 of the lens 44 is then fixed in the fixing hole 4282 of the supporting board 42 so that the lens 44 is received in the supporting board 42. At last, the cover 49 is received in the cavity 426 of the supporting board 42 and is attached to the supporting board 42 by means of adhesive. The extending portion 444 of the lens 44 extends from the through hole 462 of the cover 49. Since the lens 44 is transparent, light emitted from the flash 70 passes through the lens 44 and illuminates the scenes to be photographed. The position of the light hole 482 of the lighttight layer 48 corresponds to that of the aperture 429 of the supporting board 42, so that the camera module 80 in the aperture 429 can receive light from outside.

In use, the flash 70 emits light and the light mainly passes through the lens 44 to illuminate scenes. A portion of the light emitted from the flash 70 is repeatly reflected in the cover 49 and is gradually absorbed by the lighttight layer 48. Therefore, the light trapped in the cover 49 should not effect the image quality.

Figure 4:
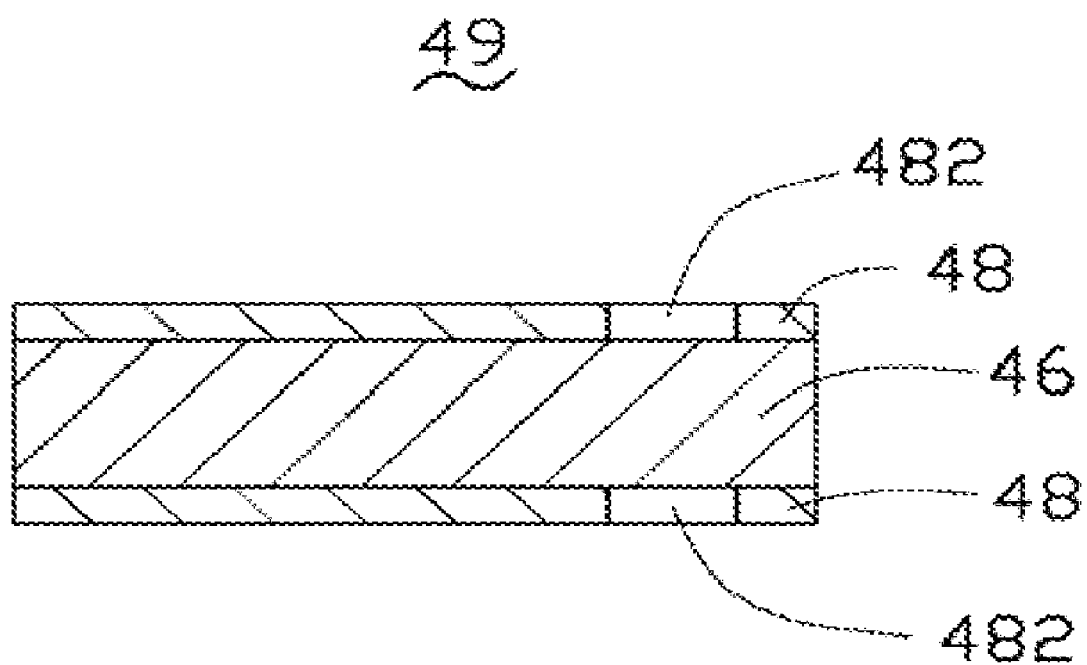
FIG. 4 is a cross-sectional view of a cover in accordance with another exemplary embodiment of the present invention.

In an alternative embodiment according to the present invention, the supporting board 42 is integrally formed with the main body 20. The number of the lighttight layer 48 may be two. Referring to FIG. 4, two lighttight layers 48 are respectively formed on two opposite surfaces of the base 46 so as to increase efficiency of absorbing the remaining light in the cover 49.

In another alterative embodiment, the lens 44 may be omitted. A diameter of the fixing hole 4282 of the supporting board 42 may be equal to that of the receiving hole 4284 which is configured for receiving the flash 70. The through hole 462 of the cover 49 may be defined in the lighttight layer 48 and the base 46 is transparent. The position of the through hole 462 corresponds to that of the stepped hole 428. Thus, the light emitted from the flash 70 can pass the cover 49 and illuminate scenes.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A protective cover assembly for electronic device including a digital camera, the electronic device further including a main body having a recess portion defined therein and a flash being located in the recess portion, the protective cover assembly comprising:
   a cover including:
      a base;
      at least one lighttight layer formed on the base; and
      a through hole defined in the cover, the through hole allowing light emitted from the flash to pass the cover; and
   a supporting board engaging in the recess portion of the main body, the supporting board defining a cavity to receive the cover.

2. The protective cover assembly as claimed in claim 1, wherein the digital camera is also located in the recess portion of the main body, the base is transparent, and a light hole defined in the lighttight layer allows the digital camera to receive light from outside.

3. The protective cover assembly as claimed in claim 2, wherein the through hole is also defined in the lighttight layer.

4. The protective cover assembly as claimed in claim 2, wherein a stepped hole and an aperture are defined in the supporting board, the stepped hole includes a receiving hole configured for receiving the flash, and the aperture is configured for receiving the digital camera.

5. The protective cover assembly as claimed in claim 4, further comprising a lens, wherein the lens includes a flange portion and an extending portion, the stepped hole further includes a fixing hole configured for receiving the flange portion of the lens, and the through hole is configured for receiving the extending portion of the lens.

6. The protective cover assembly as claimed in claim 1, wherein the lighttight layer is an oil ink layer including light absorbing material.

7. The protective cover assembly as claimed in claim 1, wherein there are two lighttight layers, and the two lighttight layers are respectively formed on two opposite surface of the base.

8. A protective cover assembly for electronic device including a digital camera comprising:
   a lens including a flange portion and an extending portion;
   a cover including a base and at least one lighttight layer, the lighttight layer being formed on the base, a through hole being defined in the cover configured for receiving the extending portion of the lens, a light hole being defined in the lighttight layer;
   a supporting board having a stepped hole and an aperture defined therein, the position of the stepped hole and the aperture respectively corresponding to the through hole and the light hole of the cover, the stepped hole including a fixing hole and a receiving hole, the fixing hole and the receiving hole being respectively configured for receiving the flange portion of the lens and the digital camera, the aperture being configured for receiving a flash, a cavity being defined in the supporting board for receiving the cover.

9. The protective cover assembly as claimed in claim 8, wherein the lighttight layer is an oil ink layer including light absorbing material.

10. The protective cover assembly as claimed in claim 8, wherein there are two lighttight layers, and the two lighttight layers are respectively formed on two opposite surface of the base.

11. A protective cover assembly for electronic device including a digital camera, the electronic device further including a flash and a main body, the main body having a recess portion to received the digital camera and the flash, the protective cover assembly comprising:
   a cover received in the recess portion, the cover including:
      a base;
      at least one lighttight layer formed on the base, the lighttight layer being an oil ink layer including light absorbing material; and
      a through hole and a light hole defined in the cover, the through hole allowing light emitted from the flash to pass the cover, the light hole allowing the digital camera to receive light from outside.

12. The protective cover assembly as claimed in claim 11, wherein the through hole and the light hole are defined in the lighttight layer.

* * * * *